United States Patent Office 3,411,940
Patented Nov. 19, 1968

3,411,940
PROCESS FOR COATING SURFACES WITH
POLYEPOXIDE COMPOSITIONS
John A. Lopez, Springfield, and Dennis Neal, Sommerville, N.J., assignors to Shell Oil Company, New York, N.Y., a corporation of Delaware
No Drawing. Continuation of application Ser. No. 289,428, June 20, 1963. This application Feb. 13, 1967, Ser. No. 615,842
10 Claims. (Cl. 117—62.2)

ABSTRACT OF THE DISCLOSURE

A process for coating surfaces is disclosed. This process comprises spreading a liquid coating containing a polyepoxide and a polymercaptan on the surface and then applying an accelerator for the epoxy/mercaptan reaction. This process also comprises applying an accelerator for an epoxy/mercaptan reaction to a surface, and then spraying on top thereof a mixture of a polyepoxide and a polymercaptan.

---

This application is a continuation of the application Ser. No. 289,428, filed June 20, 1963, and now abandoned.

This invention relates to a process for curing polyepoxides. More particularly, the invention relates to a new process for curing polyepoxides at a fast rate using polymercaptan curing agents with accelerators.

Specifically, the invention provides a new and efficient process for curing at a fast rate at low temperatures polyepoxide-polymercaptan mixtures which have a good "pot life" or storage stability at these same temperatures. The process comprises applying in separate applications (1) a polyepoxide-polymercaptan mixture, and (2) an accelerator for the epoxy-mercaptan reaction, such as, a tertiary amine by, for example, spraying the accelerator onto a layer of the polyepoxide-polymercaptan.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. The conventional polyepoxide-curing agent systems, however, have certain drawbacks that have limited their use for certain applications. For example, the known systems take considerable time to cure at low temperatures. With the best aliphatic type amine curing agents, the systems take several hours to set to a hard product. Because of this, it has been difficult to use the polyepoxide systems for applications, such as highway coatings, maintenance surface coatings and the like, where the coating must dry in a very short time.

It has been found that polymercaptans accelerated with materials, such as tertiary amines, can be used to cure the polyepoxides at a rapid rate at low temperatures. Here, however, the problem has been of too rapid a cure time. Once the components have been combined together, the mixture begins to set up and there is little "pot life" or storage time for the composition. This necessitates mixing just before the use and as a result there are difficulties in large scale operations such as coating of highways. etc.

It is, therefore, an object of the invention to provide a new process for curing polyepoxides. It is a further object to provide a new process for curing polyepoxides that brings about a fast cure at low temperatures. It is a further object to provide a new process for rapid cure of polyepoxides which involves the use of compositions having a long pot life. It is a further object to provide a new technique which provides a long working time with the polyepoxide coating composition but which brings about a rapid cure at low temperatures. It is a further object to provide a new process for preparing polyepoxide coatings. It is a further object to provide a new process for preparing polyepoxide coatings which have improved physical properties. These and other objects of the invention will be apparent from the following detailed description thereof.

It has now been discovered that these and other objects may be accomplished by the new process of the invention which comprises applying in separate applications (1) a polyepoxide-polymercaptan mixture, and (2) an accelerator for the epoxy-mercaptan reaction, such as, for example, a tertiary amine. As a preferred embodiment, the process involves applying a fluid medium containing the polyepoxide-polymercaptan mixture and then applying over the top thereof, such as spraying a layer of a solution containing the accelerator. It has been found that by the above technique, one can utilize solutions with extremely long pot life which can be premixed and allowed to stand for long periods of time. Yet when the two solutions are brought together by the above technique, the combination rapidly sets up at low temperatures to form the desired hard insoluble infusible product.

That one could obtain the above results was quite unexpected as it was thought heretofore that it was necessary to effect a thorough mixing of the accelerator with the epoxy-polymercaptan mixture before the desired cure could be obtained. It was surprising to find that this was not necessary. All that appears necessary is that some contact be made between the accelerator and the epoxypolymercaptan mixture and that the resulting mixture then rapidly sets up throughout to form the desired product.

According to the process of the invention, one of the solutions to be employed comprises a mixture of the polyepoxide and the polymercaptan. The polyepoxides to be used comprise those materials possessing more than one vicinal epoxy group, i.e., more than one

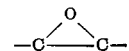

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl) adipate,
di(2,3-epoxybutyl) oxalate,
di(2,3-epoxyhexyl) succinate,
di(3,4-epoxybutyl) maleate,
di(2,3-epoxyoctyl) pimelate,
di(2,3-epoxybutyl) phthalate,
di(2,3-epoxyoctyl) tetrahydrophthalate,
di(4,5-epoxydodecyl) maleate,
di(2,3-epoxybutyl) terephthalate,
di(2,3-epoxypentyl) thiodipropionate,
di(5,6-epoxytetradecyl) diphenyldicarboxylate,
di(3,4-epoxyheptyl) sulfonyldibutyrate,
tri(2,3-epoxybutyl) 1,2,4-butanetricarboxylate,
di(5,6-epoxypentadecyl) tartarate,
di(4,5-epoxytetradecyl) maleate,
di(2,3-epoxybutyl) azelate,
di(3,4-epoxybutyl) citrate,
di(5,6-epoxyoctyl) cyclohexane-1,2-dicarboxylate,
di(4,5-epoxyoctadecyl) malonate.

Another group of the epoxy-containing materials includes those epoxidized esters of unsaturated alcohols and unsaturated carboxylic acids, such as 2,3-epoxybutyl 3,4-epoxypentanoate,
3,4-epoxyhexyl 3,4-epoxyhexyl 3,4-epoxypentanoate,
3,4-epoxycyclohexyl 3,4-epoxycyclohexanoate,
3,4-epoxycyclohexyl 4,5-epoxyoctanoate,
2,3-epoxycyclohexylmethy epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate,
dibutyl 7,8,11,12-diepoxyoctadecanedioate,
dioctyl 10,11-diethyl-8,9,12,13-diepoxy-eicosanedioate,
dihexyl 6,7,10,11-diepoxyhexadecanedioate,
dodecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanediene-dioic acid with ethylene glycol, the polyester obtained by reacting diethylene glycol, with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value of 0.514 eq./100 g.) and the like and mixtures thereof.

The polymercaptans employed in the above compositions comprise those having a plurality of free —SH groups. The number of mercapto groups will vary depending chiefly on the nature of the polyepoxide. Thus, the polyepoxides which have approximately two epoxy groups are preferably reacted with polymercaptans having more than 2 and preferably 3 to 6 —SH groups. The polyepoxides which have more than about two epoxy groups are preferably reacted with polymercaptans having approximately 2 —SH groups. The nature of the polymercaptan itself may vary depending on the nature of the product desired, i.e., fluid or solid, odor, toxicity and the like. In general, the polymercaptans may be aliphatic, cycloaliphatic or aromatic or heterocyclic and may be substituted with other substitutents, such as OH groups, halogen atoms, ether and ester radicals and the like. They may also be monomeric or polymeric.

Examples of polymercaptans include mercapto-substituted hydrocarbons, ester, ethers, urethanes, sulfides and the like, such as glycerol trithioglycolate, pentaerythritol tetrathioglycolate, 1,2,6-hexanetriol trithioglycolate, glycerol trithiolacetate, 1,2,6 - hexanetriol trithiolacetate, 1,2,4-butanetriol tri(2-mercaptobutyrate), tri(mercaptobutyl) ether of glycerol, tetra(mercaptoethyl) ether of pentaerythritol, di(mercaptoethyl) ether of 1,4-butanediol, tributyl ether of 1,4,6-trimercapto-2,5,8-octanetriol, esters of mercapto-substituted alcohols and polycarboxylic acids, such as tri(mercaptobutyl) pyromellitate, tri(mercaptobutyl) 1,2,4 - butanetricarboxylate, trimercaptoethyl) trimellitate, tri(mercaptohexyl) 1,3,5-pentanetricarboxylate and mercaptoethyl esters of polyacrylic acid, mercaptobutyl esters of copolymers of methacrylic acid and styrene, 2,4,5-trimercaptotoluene-1,6-diisocyanate, 1,4-di(mercaptomethyl) 2,3,5,6-tetramethylbenzene, trimercaptophenol, bis(2,4-dimercaptobutyl) sulfide, bis (3,5-dimercaptohexyl) sulfide, bis(2,4-dimercaptobutyl) sulfone and the like, and mixtures thereof.

Other highly functional polymercaptans that can be used include those obtained by reacting polyepoxides with hydrogen sulfide. Examples of these are set out in U.S. 2,633,458. A special group of these include those obtained by reacting polyepoxides having more than 2 epoxy groups with hydrogen sulfide. Examples of such polyepoxides include, among others, glycidyl ethers of polyhydric alcohols containing at least three OH groups, such as glycerol, 1,2,6-hexanetriol, pentaerythritol, polyvinyl alcohol, polyallyl alcohol, 1,3,5-pentanetriol, polyols obtained by reacting trihydric or higher alcohols with dibasic acids, polyols obtained by hydration of polyepoxides containing two or more epoxy groups, polyols obtained by homopolymerizing and copolymerizing vinyl or allylic monomers containing OH groups, such as hydroxyethyl acrylate and the like.

Other examples of polyepoxides possessing more than 2 epoxy groups include the glycidyl ethers of polyhydric phenols containing at least three OH groups, such as, for example, 1,3,5-trihydroxybenzene, 2,2-bis(4,6-dihydroxyphenyl)propane, 2,2 - bis(4,6 - dihydroxyphenyl)sulfone, and 1,3,5-trihydroxynaphthalene, and polyhydric phenols obtained by reacting phenols with formaldehyde (novolac resins), the glycidyl ethers of which are represented by the formula

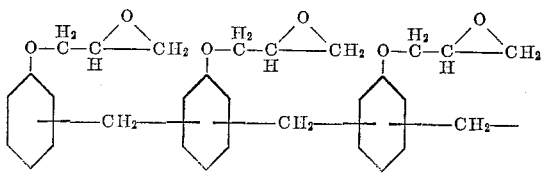

Another group of polyepoxides possessing more than 2 epoxy groups to be reacted with the hydrogen sulfide include, among others, those esters of epoxy alcohols and polycarboxylic acids containing at least three carboxyl groups, and alternatively, those esters of epoxy acids and polyhydric alcohols or phenols containing at least three OH groups. Examples of such esters include, among others, triglycidyl ester of 1,2,4-butanetricarboxylic acid, triglycidyl ester of 1,3,6-hexanetricarboxylic acid, triglycidyl ester of trimellitic acid, glycidyl ester of poly(acrylic acid), glycidylesters of poly(methacrylic acid), glycidyl ester of pyromellitic acid, and ester of 2,3-epoxypropionic acid and 1,2,6-hexanetriol, ester of 2,3-epoxypropionic acid and glycerol, esters of 3,4-epoxybutanoic acid and polyvinyl alcohol and the like.

The highly functional mercaptan products are obtained by reacting the above-noted polyepoxides with hydrogen sulfide. The amount of the hydrogen sulfide to be employed may vary, but it is preferred to use an excess of the hydrogen sulfide. For best results it is preferred to add the polyepoxide and hydrogen sulfide in mol ratios of 1:20 to 1:4, and more preferably from 1:10 to 1:3. The reaction between the polyepoxide and hydrogen sulfide is preferably accomplished in the presence of catalysts, such as alkaline materials as sodium hydrosulfide, sodium ethoxide, sodium phenoxide and the like, and small amount of amine compounds, such as diethyl amine, melamine and the like. The amount of catalyst employed may vary from about .001% to about 5% by weight. The temperature employed in the reaction may vary over a wide range. In some instances, it may proceed at low temperatures such as −15° C., to room temperatures. Preferred temperatures range from about 40° C. to 100° C. At the completion of the reaction, the polymercaptan can be recovered by any suitable means, such as distillation, extraction, filtration and the like.

Illustration of the above method for making highly functional polymercaptans is given below for the reaction of a glycidyl ether of a novolac resin with hydrogen sulfide:

About 500 parts of a glycidyl polyether of novolac resin having an epoxy value of 2.82 eq./100 g. was dissolved in toluene. Hydrogen sulfide was bubbled into the reaction mixture until the mixture was saturated. The mixture was allowed to stand overnight and then distilled to yield a viscous liquid polymercaptan having a −SH value of .41 eq./100 g.

Other examples of polymercaptans include those obtained by reacting polythiiranes with hydrogen sulfide as disclosed and claimed in copending patent application Ser. No. 231,852, filed Oct. 19, 1962 now U.S. Patent No. 3,369,040, issued Feb. 13, 1968, and so much of that disclosure pertinent to the preparation of these polymercaptans is incorporated herein by reference.

Other polymercaptans include those obtained by adding hydrogen sulfide to polyunsaturated compounds, such as polybutadienes, polyisoprenes and the like. This addition is preferably accomplished in the presence of catalysts, such as isopropylamine. These mercaptan substituted polymers preferably have molecular weights varying from about 150 to about 10,000 as determined ebullioscopically in toluene.

Another group of special polymercaptans include the mercapto-substituted heterocyclic compounds, such as tri(mercaptomethyl) trioxanes, and the like, as described and claimed in copending application Ser. No. 254,365, filed May 31, 1963; now issued U.S. Patent No. 3,297,635, and aromatic compounds substituted with mercapto-containing side chains, such as described and claimed in copending application Ser. No. 284,322, filed May 31, 1963; now issued U.S. Patent No. 3,310,527, and so much of these disclosures pertinent to the preparation of these new polymercaptans is incorporated herein by reference.

Especially preferred polymercaptans to be employed in the process of the invention include the esters of the polyhydric alcohols and mercapto-substituted mono- and polycarboxylic acids, the esters of the mercapto-substituted alcohols and the polycarboxylic acids, the adducts of hydrogen sulfide and polyepoxides, the adducts of hydrogen sulfide and polythiiranes, the mercapto-substituted heterocyclic compounds and the aromatic compound substituted with mercapto-substituted side chains. These special polymercaptans preferably contain no more than 25 carbon atoms.

The accelerators for the reaction of the above-described polyepoxides and polymercaptans include, among others, the phenols, sulfides, tertiary amines, organic phosphines, organic arsines, organic antimony compounds, amine salts, or quaternary ammonium salts, and the like. Preferred activators are the phenols, phosphines, arsines, amines, and sulfides, such as, for example benzyldimethylamine dicyandiamide p,p′-bis(dimethylaminophenyl) methane, pyridine, dimethyl aniline, dimethylethanolamine, methyldiethanolamine, norpholine, dimethylaminopropylamine, dibutylaminopropylamine, stearyldimethylamine, tri-n-butyl amine, N,N-dibutyl butylamine, tri-n-hexylamine, ethyl di-n-propylamine, phenylene diamine, diethylene triamine, dibutyl sulfide, dioctyl sulfide, dicyclohexyl sulfide and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof.

Particularly preferred activators to be used are the sulfides, phosphines and tertiary amines, and more preferably the mono- and diamines wherein the amine hydrogens have been replaced by aliphatic, cycloaliphatic, or aromatic hydrocarbon radicals containing not more than 15 carbon atoms, such as, for example, the trialkyl amines, triaryl amines, triarylalkylamines, alkyl arylalkyamines, tricycloalkylamines, alkyl dicycloalkylamines, diaminoalkanes, dialkylene triamines, phenylene diamines and di(aminoaryl) alkanes. Preferred amine salts are the hydrochloride, sulfate and acetate of the above-described preferred amines. The preferred quaternary salts are those of the formula

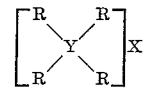

wherein Y is nitrogen, R is an alkyl, aryl or arylalkyl radical, preferably containing no more than 12 carbon atoms and X is chlorine.

In the operation of the process of the invention, one mixture is prepared containing the polyepoxide and the polymercaptan and the second component is the accelerator. The mixture containing the polyepoxide and the polymercaptan can be prepared by merely mixing the two components together. The ratio of the two components may vary over a wide range. In general, the polyepoxide is combined with at least .8 equivalent of the polymercaptan. As used herein "equivalent amount" refers to that amount needed to furnish one −SH group per epoxy group to be reacted. Preferably the polyepoxide and polymercaptans are combined in chemical equivalent ratios varying from about 1.5:8 to .8:1.5.

The mixture of polyepoxide and polymercaptan is preferably employed in a mobile condition. If the component or components are thick liquids or solids, this may be accomplished by heating the mixture or by use of diluents or solvents. Various solvents or diluents may be employed. These may be volatile solvents which escape from the polyepoxide compositions containing the adduct by evaporation before or during the curing such as, esters such as ethyl acetate, butyl acetate, Collosolve acetate (ethylene glycol monoacetate), methyl Cellosolve acetate (acetate ethylene glycol monomethyl ether), etc., ether alcohols, such as methyl, ethyl or butyl ether or ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide mixture.

The accelerator component may be applied as such or in solvent or diluent. As only small amount of the accelerator is actually needed for the operation, it is generally preferred to add the accelerator in the form of a solution. Suitable solvents or diluents include those utilized above for the other mixture containing the polyepoxide and polymercaptan.

The amount of the accelerator to be utilized in the final curing process may vary over a wide range. As the reaction is a catalyst reaction, the amount is not critical. In general, it is preferred to utilize about .1% to 5% by weight of the polyepoxide. This type of proportion is generally obtained by the use of solutions in the range of from 1% to 80% in concentration. If one applies the accelerator solution by spraying, it is preferred to utilize the solutions having concentrations varying from about 5% to about 50%, and more preferably from about 10% to 30%.

Various other components can be mixed with the solution containing the polyepoxide and polymercaptan or the solution containing the accelerator. Examples of such materials include, among others, pigments, fillers, dyes, extenders, such as tars, asphalts, resins, plasticizers and the like.

According to the process of the invention, the cure is accomplished by applying the above-noted two solutions in separate applications. Thus, the solution containing the accelerator may be first applied and the solution containing the polyepoxide and polymercaptan can then be applied over the top of the first, or alternatively, the solution containing the polyepoxide and polymercaptan can be applied first and then the solution containing the accelerator. Further, the invention contemplates the simultaneous application of the two solutions such as by applying the two solutions simultaneously from two separate spray guns onto the surface to be coated. Thus, the time elapsing between applications is not important as long as the solutions are introduced from separate containers or sources of supply and mixed at the site of use, e.g., as on the surface to be coated.

As noted above, the polyepoxides can be cured according to the process of the invention at the low reaction temperature, e.g., ambient temperature, so there is no need to apply external heat. However, in some cases, it may be desirable to apply some heat to increase the rate of cure. Suitable temperatures preferably range from about 15° C. to about 150° C., with the more preferred range varying from about 15° C. to 75° C. With small castings, it is preferred to cure at room temperature and then post cure for a few hours at elevated temperatures, say from 50° C. to 150° C. For surface coatings, it is generally preferred to effect the cure at the lower range of temperatures from 15° C. to about 50° C. The cure time will vary from a few minutes to a few hours depending on the type and quantity of reactants, thickness of film, etc. Clear relatively thin surface coatings generally cure in a matter of 5 to 20 minutes.

As noted above, one of the great advantages of the present process is the long pot lives of the two solutions as well as the rapid cure when needed. As shown in the working examples, the mixture of polyepoxide and polymercaptan have pot lives of several days, but when used in the process are able to be cured in a matter of minutes.

The above process may be utilized in many important commercial applications. The process is particularly suited for use in preparing surface coatings, and particularly those requiring rapid cures as for non-skid highway coatings, coating of loading areas, storage areas, factory floors, storage tanks and the like, as well as many conventional applications, such as painting of ships, automobile parts, etc. In these applications, the two solutions are prepared as above and any of the special techniques are employed in applying the two solutions.

The above process is also applicable in lamination and filament winding applications. In this latter application, the filaments, such as, for example, glass fibers are passed into and through one of the liquid compositions and then wound onto the desired mandrel or form. The second solution can be applied to the glass roving before, during or after the application of the other solution. The finally treated composition can then be cured in conventional manner. One advantage of the present process is that the composition can be cured at low temperatures and this would thus not affect any heat sensitive material that may be present. For example, the rubber lining of missile cases are heat sensitive and would be affected by the use of high temperatures for curing material thereon. The new process thus could be used for filament winding of these cases where the winding is directly on the liner.

The new process is also applicable in other uses, such as in the formation of adhesives, in the formation of thin coats of electrical apparatus as in encapsulation applications and the like.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise specified parts described in the examples are parts by weight. The polyethers referred to by letter hereinafter are those set out in U.S. 2,633,458.

Example I

This example illustrates the preparation of a fast drying clear coating using Polyether A containing butyl glycidyl ether, a hydrogen sulfide adduct of a phenol-formaldehyde resin and benzyl dimethtylamine as the accelerator.

100 parts of Polyether A containing 15 parts of butyl glycidyl ether was combined with 156 parts of an adduct of hydrogen sulfide and a phenol-formaldehyde resin having a mercaptan value of .41 eq./100 g. and 156 parts of a solvent made up of equal parts xylene, methyl isobutyl ketone, and Cellosolve. This mixture was spread on tin panels to form a coating of about 3 mils thick. A catalyst solution containing 50 parts of benzyl dimethylamine and 200 parts of solvent made up of equal parts of xylene, methyl isobutyl ketone and Cellosolve was prepared and sprayed onto the layer of Polyether A and polymercaptan already applied to the tin panels. The mixture was then allowed to set hard at room temperature. The product dried hard in 5 to 10 minutes to form a hard insoluble infusible coating. The pot life of the Polyether A-polymercaptan solution was over 3 days.

A similar coating was prepared by premixing the benzyl dimethyl amine with the Polyether A and hydrogen sulfide adduct before the mixture was applied as a coating. In this case the coating set up in 30 minutes. The pot life of the solution, however, was only 30 minutes also.

A glycidyl polyether of polyepichlorohydrin having a formula as described in U.S. 3,058,921, having a molecular weight of 615 and an epoxy value of 0.388 eq./100 g. was used as a replacement for ½ and for ¾ of the Polyether A. Related results were obtained with each of these systems.

A glycidyl polyether of polyepichlorohydrin was used as a replacement for ¾ of the Polyether A. Related results were again obtained.

A similar coating was also prepared by applying only the Polyether A and hydrogen sulfide adduct. In this case, the coating dried in about 17 hours and the pot life was about 3 days.

A review of the drying times and pot lives of the above coatings is given below:

| Catalyst | Dry Hard | Pot Life |
|---|---|---|
| None | 17 hours | >3 days. |
| Premixed | 30 minutes | 30 minutes. |
| Two applications | 5-10 mi utes | >3 days. |

Example II

This example illustrates the preparation of a fast drying pigmented film using Polyether A containing butyl glycidyl ether, a hydrogen sulfide adduct of a phenol-formaldehyde resin and benzyl dimethylamine as the accelerator.

115 parts of Polyether A containing 15 parts butyl glycidyl ether was combined with 180 parts of an adduct of hydrogen sulfide and a phenol-formaldehyde resin having a mercaptan value of .41 eq./100 g. and 285 parts of solvent made up of ethyl acetate and toluene at 70/30 and 560 parts of white pigment.

| | |
|---|---|
| Titanium calcium pigment | 450 |
| Diatomacious silica | 35 |
| Calcium carbonate | 75 |
| | 560 |

This mixture was spread on tin panels to form a coating of about 15 mils thick. A catalyst solution containing 50 parts of benzyldimethylamine and 200 parts of a solvent made up of equal parts of xylene, methyl isobutyl ketone and Cellosolve was prepared and sprayed onto the layer of Polyether A and polymercaptan applied as above. The mixture was then allowed to set hard at room temperature. The product dried hard (tack free) in 5 to 10 minutes and dried through in less than 17 hours. The product had a pot life of greater than 2 days.

A similar coating prepared without the use of the catalyst dried hard (tack free) in 60 minutes with through dry of 30 hours.

Example III

Example II was repeated using tris(mercaptoethyl) trioxane in place of the hydrogen sulfide adduct. Related results are obtained.

Example IV

Examples I and II are repeated with the exception that the hydrogen sulfide adduct was replaced with dimercaptoethyl-3,4-dimercaptocyclohexane. Related results are obtained.

Example V

Examples I and II are repeated with the exception that the accelerator employed is diethyl sulfide. Related results are obtained.

Example VI

Examples I and II are repeated with the exception that the solution containing the benzoldimethylamine is applied to the tin plate first and then the solution containing Polyether A and hydrogen sulfide adduct spread over the top as by spray application. Related results are obtained.

Example VII

Examples I and II are repeated with the exception that the two separate solutions were sprayed simultaneously from spray guns placed close together over the tin plate. Related results are obtained.

Example VIII

Examples I to IV are repeated with the exception that the Polyether A is replaced with Polyether B and Polyether C. Related results are obtained.

Example IX

Examples I and II are repeated with the exception that the accelerator employed is as follows: triphenyl phosphine, tricyclohexyl phosphine and triamyl phosphine. Related results are obtained in each case.

Example X

Examples I and II are repeated with the exception that the polymercaptan employed is as follows: 1,2,6-hexanetriol trithioglycolate, pentaerythritol tetrathioglycolate, hydrogen sulfide adduct of diglycidyl ether of 2,2-bis(4-hydroxyphenyl)propane, 1-(dimercaptoethyl)-2,3-dimercaptocyclohexane, and the tri(mercaptoethyl) ether of glycerol. Related results are obtained.

Example XI

Examples I, II, VI, VII and X are repeated with the exception that the accelerator employed is as follows: benzyltrimethylammonium chloride, phenyltributylammonium chloride and benzyltrimethylammonium borate. Related results are obtained in each case.

We claim as our invention:

1. A process for producing a coating of a cured polyepoxide composition on a surface at a fast rate at a temperature below about 50° C. which consists of spreading out on the surface a film of a liquid coating containing as the only reactive components a polyepoxide having more than one vic-epoxy group and at least 0.8 equivalent of a polymercaptan containing more than two —SH groups, then applying on the top of that film a coating containing as the only reactive component an accelerator for the epoxy-mercaptan reaction, and allowing the combined composition to set hard at a temeprature below 50° C.

2. A process as in claim 1 wherein the polyepoxide is a liquid glycidyl polyether of a polyhydric phenol.

3. A process as in claim 1 wherein the polymercaptan is a hydrogen sulfide adduct of a glycidyl ether of a phenol-aldehyde condensate.

4. A process as in claim 1 wherein the accelerator is a tertiary amine.

5. A process as in claim 1 wherein the accelerator is a dialkyl sulfide.

6. A process as in claim 1 wherein the solution containing the accelerator is applied by spraying.

7. A process as in claim 1 wherein the accelerator is a quaternary ammonium salt.

8. A process as in claim 1 wherein the accelerator is a phosphine.

9. A process as in claim 1 wherein the polymercaptan is a hydrogen sulfide adduct of a polythiirane.

10. A process for coating a surface with a cured polyepoxide composition at a fast rate at a temperature below 50° C. which consists of applying a film of a liquid coating containing as the only reactive component an accelerator for an epoxy-mercaptan reaction to the desired surface, spraying on top of the film a coating containing as the only reactive components a mixture of a polyepoxide having more than one vic-epoxy group and at least 0.8 equivalent of a polymercaptan, and allowing the resulting combined composition to set hard at a temperature of 150° C. to 50° C.

References Cited

UNITED STATES PATENTS

| | | | |
|---|---|---|---|
| 2,633,458 | 3/1953 | Shokal | 117—132 X |
| 3,012,487 | 12/1961 | Mika | 117—161 X |
| 3,041,195 | 6/1962 | Saewert et al. | 117—62.2 X |
| 3,135,625 | 6/1964 | Ingrassia | 117—161 X |
| 3,159,500 | 12/1964 | Dowling | 117—161 X |
| 3,218,190 | 11/1965 | Patterson et al. | 117—161 X |
| 3,240,619 | 3/1966 | Winchester | 117—62.2 X |
| 3,250,640 | 5/1966 | Varlet | 117—62.2 |
| 3,264,230 | 8/1966 | Proops | 260—831 X |
| 3,291,776 | 12/1966 | Newey et al. | 260—47 |
| 3,297,635 | 1/1967 | Bergman et al. | 260—47 |
| 3,310,527 | 3/1967 | De Acetis et al. | 260—47 |
| 3,316,324 | 4/1967 | Mendoyanis | 260—830 |

WILLIAM D. MARTIN, *Primary Examiner.*

M. LUSIGNAN, *Assistant Examiner.*